United States Patent
Gorti

(10) Patent No.: US 8,839,229 B2
(45) Date of Patent: *Sep. 16, 2014

(54) RUN-TIME DETERMINATION OF APPLICATION DELIVERY

(75) Inventor: Sreenivasa R. Gorti, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 597 days.

This patent is subject to a terminal disclaimer.

(21) Appl. No.: 12/831,502

(22) Filed: Jul. 7, 2010

(65) Prior Publication Data

US 2010/0275195 A1 Oct. 28, 2010

Related U.S. Application Data

(63) Continuation of application No. 10/387,571, filed on Mar. 14, 2003, now Pat. No. 7,779,405.

(51) Int. Cl.
*G06F 9/44* (2006.01)
*G06F 9/445* (2006.01)
*H04L 29/08* (2006.01)

(52) U.S. Cl.
CPC .. *G06F 8/61* (2013.01); *G06F 8/76* (2013.01); *H04L 67/30* (2013.01)
USPC .......................................... 717/172; 717/120

(58) Field of Classification Search
CPC ............. G06F 9/445; G06F 8/60; G06F 8/70; H04L 67/30
USPC ................. 717/168–178, 101–102, 106–107, 717/120–122
See application file for complete search history.

(56) References Cited

U.S. PATENT DOCUMENTS

| | | |
|---|---|---|
| 6,167,441 A | 12/2000 | Himmel |
| 6,412,008 B1 | 6/2002 | Fields et al. |
| 6,430,624 B1 | 8/2002 | Jamtgaard et al. |
| 6,438,559 B1 | 8/2002 | White et al. |
| 6,470,378 B1 | 10/2002 | Tracton et al. |
| 7,779,405 B2 * | 8/2010 | Gorti ............................ 717/172 |
| 2002/0032754 A1 | 3/2002 | Logston et al. |
| 2002/0035617 A1 | 3/2002 | Lynch et al. |
| 2002/0049788 A1 | 4/2002 | Lipkin et al. |
| 2002/0073236 A1 | 6/2002 | Helgeson et al. |

(Continued)

OTHER PUBLICATIONS

Roland Haratsch, "A Client-Server Architecture for providing Client-specific, Interactive Network Services on the Application Layer", 2001, Proceedings of APC2001, pp. 1-10.*

(Continued)

*Primary Examiner* — Ted T Vo
(74) *Attorney, Agent, or Firm* — Greenblum & Bernstein, P.L.C.

(57) ABSTRACT

A software application is delivered to a client device. A plurality of alternate component versions for a first software component of a software application are stored. A plurality of alternate component versions for a second software component of the software application are stored. One of the plurality of alternate component versions for the first software component is selected. One of the plurality of alternate component versions for the second software component is selected. The selected alternate component version for the first software component is delivered to a client device. The selected alternate component version for the first software component is executed by the client device and the selected alternate component version for the second software component is executed by an application server.

20 Claims, 4 Drawing Sheets

(56) References Cited

U.S. PATENT DOCUMENTS

| | | |
|---|---|---|
| 2002/0107891 A1 | 8/2002 | Leamon et al. |
| 2002/0120571 A1 | 8/2002 | Maung et al. |
| 2002/0194219 A1 | 12/2002 | Bradley et al. |
| 2002/0194263 A1 | 12/2002 | Murren et al. |
| 2002/0194388 A1 | 12/2002 | Boloker et al. |

OTHER PUBLICATIONS

Borko Furht et al., "An Innovative Internet Architecture for Application Service Providers", 2000, IEEE, pp. 1-10.*

Borko Furht et al., "Internet Architectures for Application Service Providers", 2000, ACM, pp. 67-91.*

Grundy et al., "Support for Collaborative, Integrated Software Development", 1995, IEEE, pp. 84-94.*

Jeffery M. Capone, Extending J2EE for Mobile Application Development, Oct. 2001, O'Reilly on Java.com, pp. 1-10.

Author(s) Unknown. Fablet™. [online], [retrieved no later than Dec. 26, 2002], retrieved from the Internet, <URL: http://www.fourbit.com/docs/Fablet_Benefit_WP.pdf>.

Author(s) Unknown. Introducing MobileBuilder: FAQ? [online], [retrieved no later than Dec. 27, 2002], retrieved from the Internet <URL: http://www.penright.com/product-faq.htm>.

Author(s) Unknown. High Level Architectural Design. [online], [retrieved no later than Feb. 14, 2003], retrieved from the Internet <URL: http://www.scifiguys.com/designs/architecture.html>.

Author(s) Unknown. Introduction (Enterprise Java Beans). [online], [retrieved no later than Feb. 14, 2003], retrieved from the Internet <URL: http://www.adderpit.com/oreilly/javacd/ebeans/ch01_01.htm>.

* cited by examiner

RUN-TIME DETERMINATION OF APPLICATION DELIVERY

CROSS REFERENCE TO RELATED APPLICATIONS

This is a continuation application of pending U.S. application Ser. No. 10/387,571, filed Mar. 14, 2003, the content of which is expressly incorporated by reference herein it its entirety.

BACKGROUND OF THE INVENTION

1. Field of the Invention

The present invention relates to the field of software application delivery. More particularly, the present invention relates to dynamically partitioning a software application and delivering application components to a requesting client device.

2. Background Information

A need exists to ensure that software applications are dynamically partitioned and delivered to a client device according to the profile constraints of the client device. Presently, many web-based software applications are readily available by request over the internet. However, web-based software applications are presently written with static partitioning and delivery rules. For example, an application author may write an application so that a presentation layer of a web-based software application is delivered to the client device while interaction, business objects and data layers are retained at an application server. However, the application is partitioned without regard to the particular constraints of the requesting client device because the partitioning of the presentation layer from the interaction, business objects and data layers is predetermined by the application author. For example, even if the interaction layer of a client device could be supported by the requesting client device, there is no mechanism for dynamically partitioning the interaction layer and delivering the interaction layer to the client device.

As a result of the previous inability to dynamically partition and deliver an application, an application author is motivated to provide a primitive application to ensure the application can be delivered to the greatest number of client devices. For example, a primitive application may be authored with a primitive application user interface so as to be available to a wide variety of devices. Additionally, an application author may provide an application that requires continuous network connectivity so as to make the application available to the greatest number of client devices by supporting the layers of the application, e.g., the interaction layer, the business objects layer and/or the data layer, at an application server.

However, many existing client devices are capable of supporting complex application layer components. For example, many traditional personal computers (PCs) can support a rich user interface for a software program. Additionally, many existing client devices are capable of supporting the interaction, business objects and/or data layers of an application without needing continuous network connectivity.

Accordingly, a need exists to dynamically determine the appropriate partitioning of a software application according to a profile of the requesting client device. A need exists for an ability to select components for delivery to a client device according to the partitioning determination. Additionally, a need exists to deliver the selected application components to a requesting client device.

To solve the above-described problems, an application delivery system and method is provided to deliver dynamically partitioned software application components to a requesting client device.

SUMMARY OF THE INVENTION

Not Applicable

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
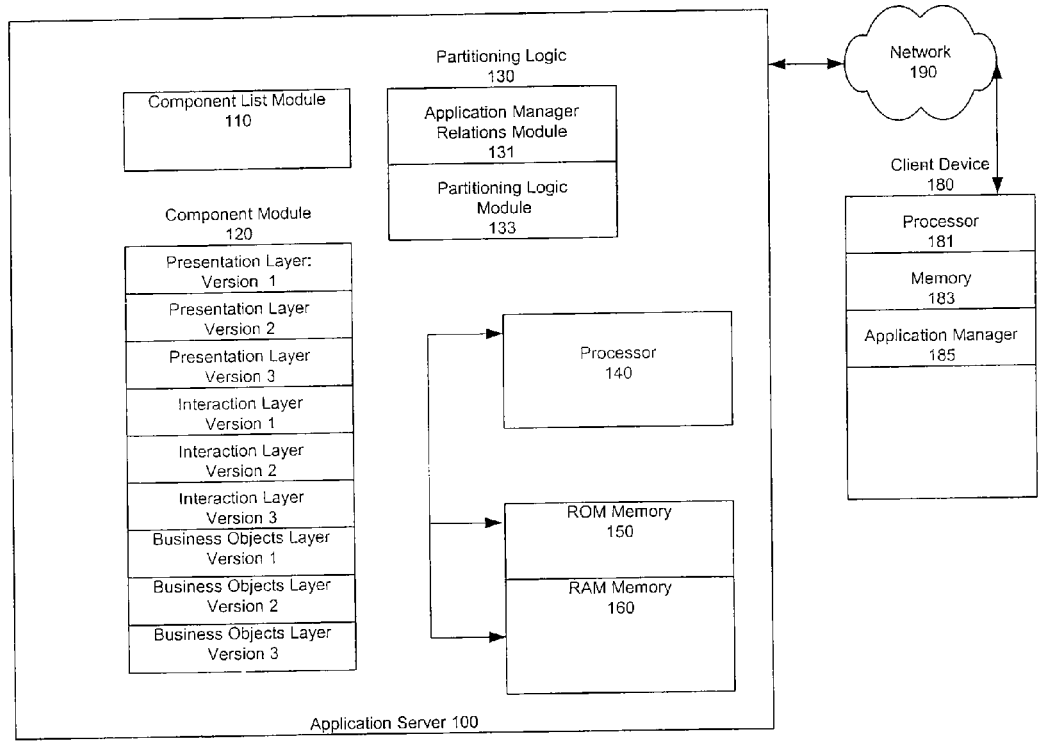
FIG. 1 shows an exemplary network architecture of the application delivery system, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, a method for delivering a software application to a requesting client device is provided. The method includes receiving a request from the client device to launch the software application. The software application includes multiple software components. A profile of the client device is determined. The multiple software components are dynamically partitioned based on the determined profile into a first group and a second group. The first group is delivered to the client device based on the determined profile. According to another aspect of the present invention, the method includes retaining the second group based on the determined profile. According to still another aspect of the present invention, the method includes executing the application using the delivered and retained software components.

According to yet another aspect of the present invention, the delivered group includes a presentation layer software component. According to another aspect of the present invention, the delivered group includes an interaction layer software component, a business objects layer software component and/or a data layer software component. According to still another aspect of the present invention, the partitioning includes selecting a component version from multiple component versions based on the determined profile. According to yet another aspect of the present invention, the determining includes determining a physical display characteristic of the client device, at least one language supported on the requesting client device, a processing potential of the client device, a processor configuration of the client device, available client device memory, and/or a client device network connection speed.

According to another aspect of the present invention, the method includes determining a user selection of a delivery preference and partitioning the multiple software components according to the determined user selection. According to still another aspect of the present invention, the method includes forwarding an application manager to the client device to determine the profile of the client device. According to yet another aspect of the present invention, the method includes requesting the client device to forward the profile.

According to an aspect of the present invention, a system for delivering a software application to a requesting client device is provided. The system includes an application server that receives a request from the client device to launch the software application. The software application includes multiple software components. The application server determines a profile of the client device and partitions the multiple software components based on the determined profile into a first group and a second group. The application server delivers the first group to the client device based on the determined profile. According to another aspect of the present invention, the application server retains the second group according to the determined profile. According to still another aspect of the present invention, the application is executed using the delivered and retained software components.

According to yet another aspect of the present invention, the delivered group includes a presentation layer software component. According to another aspect of the present invention, the delivered group includes an interaction layer software component, a business objects layer software component and/or a data layer software component. According to still another aspect of the present invention, the application server selects a component version from multiple component versions based on the determined profile.

According to yet another aspect of the present invention, the application server determines a physical display characteristic of the client device, a language supported on the requesting client device, a processing potential of the client device, a processor configuration of the client device, available client device memory, and/or a client device network connection speed. According to another aspect of the present invention, the application server determines a user selection of a delivery preference and partitions the multiple software components according to the determined user selection. According to still another aspect of the present invention, the application server forwards an application manager to the client device to determine the profile of the client device. According to yet another aspect of the present invention, the application server requests the client device to forward the profile.

A software application is authored for partial delivery as a web service over a communications network to a client device. The software application includes multiple layers written in a conventional programming language using traditional programming language constructs. For example, the application may be written as an object-oriented program using Java, Visual Basic and/or C++.

An application typically includes layers that are categorized as, e.g., "presentation", "business objects" and "data". Recently, applications have also been written with an "interaction" layer to specify interactions between the user and the presentation layer. An authoring framework environment is used to provide an application author with a toolkit to develop the application layers. The authoring framework environment may be an integrated development environment (IDE) such as, for example, Microsoft Visual Studio.net or Sun Microsystem's Forte.

Components for each application layer are developed with the authoring framework environment using a component-based development model. For example, a presentation layer component may provide a user interface on the client device. The business objects layer may provide functional components that process data. The data layer may provide a data management component that stores the data required by the business objects layer. Additionally, an interaction layer component may specify a list of potential interactions between a user and a presentation layer component. Thus, an application may include separable components of the presentation, interaction, business logic and data layers.

An author of the application may establish policies governing the partitioning and delivery of the separate components of the application layers. For example, the author may establish a policy that a particular component always executes on an application server or always executes on a client device. However, where the author does not establish a policy governing the delivery and execution of a particular component on only an application server or a client device, the component may be delivered according to a dynamic partitioning determination based on a profile of the requesting client device.

Additionally, based upon the partitioning and delivery policies, the authoring framework environment may also generate an appropriate set of alternative versions for each component. The alternative versions may vary so that a version of a partitionable component can be delivered to a client device according to a profile of the client device. In other words, after determining that a component of an application can be partitioned and delivered to a client device, an appropriate version of the component may be selected for delivery to a requesting client device based upon the profile of the client device. Accordingly, the alternative component versions can be provided so that a dynamic partitioning determination results in the delivery of the most appropriate version of an application component.

The clients and applications are generically categorized as "thin", "smart" or "rich". A rich application offers several advantages over a thin client application. For example, if a web-based application is downloaded from the internet, a rich application that is delivered to a client device may offer a secure execution environment for the application. The rich application may define code access security installation mechanisms for a downloaded application module. Additionally, the rich application may define mechanisms to update a downloaded application through, e.g., direct communications over the internet or a delayed synchronization support mechanism. Because of the disparity in the abilities of client devices, a partitioning and delivery determination is preferably made for each application depending on the criteria specified by the application author, the application parameters and a profile of the requesting client device.

FIG. 1 shows an exemplary computer network architecture of the present invention. As shown, the computer network architecture includes a client device 180. The client device 180 is a user terminal that can send and receive communications over a communications network using, e.g., connections, receivers, transmitters and network gateways provided by communications service providers. Exemplary client devices include a wireless phone, a wireless access protocol (WAP) cellular phone, a personal digital assistant (PDA), a personal computer (PC), a handheld computer, a desktop computer, a laptop computer, a notebook computer, a mini computer, a workstation, a mainframe computer, a set top box for a television, a web-enabled television, an interactive kiosk, a mobile web browser, or any other type of device that permits access to the communications network.

As shown, the client device 180 supports a processor 181, a memory 183 and an application manager 185. The processor 181 may be any conventional single or multi-chip microprocessor or special purpose microprocessor. The memory 183 may be an addressable storage medium or computer accessible medium, such as random access memory (RAM), an electronically erasable programmable read-only memory, erasable programmable read-only memory, a hard disk, a floppy disk, a laser disk, a compact disk, or any other memory that stores electronic content such as programs and data.

The application manager 185 is used to manage the partitioning and delivery of an application. The application manager 185 is a very thin program that is used to initiate an application launch. The application manager 185 may be implemented as, e.g., a software logic module ranging from an application-specific application component downloaded from the application server 100 upon request, to a permanent client application. In an embodiment, the application manager 185 is a web browser.

The first time a new application is requested, the client device 180 uses the application manager 185 to dynamically determine the appropriate partitioning of the application. The application manager 185 determines required profile information that is used to partition the application components. Because the required profile information may vary for different applications, the partitioning determination may be based upon different profile information for each application.

The application manager 185 creates or retrieves profile information of the client device 180 and either determines which components can be supported by the client device 180 or forwards a profile to the application server 100 to determine which components can be supported by the client device 180. Application components are partitioned from the application and delivered to the client device 180 based upon the determination of which components can be supported by the client device 180.

The profile information of the client device may be, for example, information of a programming language requirement of the client device 180. Additionally, the profile information may be a presentation parameter of the client device 180, such as information of a display (not shown) associated with the client device. The profile information may also be a processing parameter, such as a processing speed, of the client device 180. Additionally, the profile information may be a memory capacity of the client device 180, or a network connection requirement of the client device 180. The profile information can include any limitation of a client device 180 that can be used to determine whether an application component can be supported by the client device 180.

In an embodiment, the application manager 185 can create or retrieve the profile and determine the appropriate partitioning and delivery of the application without forwarding the profile information to the application server 100. The application manager 185 receives and processes information of the requested application that is forwarded by the application server 100. The client device 180 may receive parameters of the requested application and use the application manager 185 to determine which application components can be supported by the client device 180 according to the profile information as described above.

The client device 180 communicates through a communications network 190 with the application server 100. The communications network 190 may be a network or combination of networks, including wireline networks, wireless networks, or a combination of wireline and wireless networks. The network(s) may include, e.g., the internet or another network for packet switched transmission, a satellite or radio network, a cable network, the public switched telephone network (PSTN), or an advanced intelligent network (AIN). A network may also include a virtual private network (VPN) that provides secure and encrypted communications between nodes of the network. The noted networks are used as non-limiting examples; as used herein, the terms "network" and "networks" refer to any network or combination of networks that interconnect multiple devices and/or provide a medium for transmitting data from one device to another.

The application server 100 has partitioning logic 130 which includes an application manager relations module 131 and a partitioning logic module 133. The application manager relations module 131 includes logic for processing requests from the applications manager 185. The partitioning logic module 133 includes logic for partitioning and delivering an application. Of course, in an embodiment, the application server 100 may forward application parameters to the client device 180 so that the application manager 185 can determine the partitioning of the application components. In the case where the application manager 185 determines which components can be supported by the client device 180, the client device 180 forwards the results to the application server 100 so that the partitioning logic 130 can partition and deliver the application for execution.

The application server 100 includes a processor 140, ROM memory 150 and RAM memory 160. The application server 100 also includes a component list module 110 for listing separable components of an application. The separable components are stored by the component module 120. In the embodiment shown in FIG. 1, different versions of an application's layers are stored. The different versions may be different versions of separable components of a single layer. The components are selected from the component module 120 based upon the determination of which components can be supported by the client device 180. Accordingly, the selection of application components from the component module 120 is based upon the profile information of the client device 180. If the application's author permits the delivery of a component and if the user has not indicated a preference that a particular component not be delivered to the client device 180, then the component may be delivered to the client device 180 based upon the partitioning determination and component selection. Additionally, an application author may specify a preferential order for the selection of components for delivery to the client device 180.

As an example, if a client device 180 will only support a thin presentation layer, the partitioning determination may result in the delivery of only thin presentation layer components to the client device 180. However, if a client device 180 will support a rich presentation layer, the partitioning determination may result in the delivery of additional or more complex presentation layer components to the client device 180. However, even when reasons exist for delivering a rich component to a client device 180, a thin component may be selected and delivered, although the rich component is available, when the application author has specified the selection of the thin client.

Additionally, if a client device 180 will support an interaction layer or business objects layer, the interaction layer or business objects layer components may be delivered to the client device 180. However, if the client device 180 will not support an interaction layer or business objects layer, the interaction layer or business objects layer components are retained at the application server 100 during execution of the application.

As an example of the alternative components stored in the component module 120, a set of presentation layer components may include an XHTML/WML pages component version (with associated URIs) and an alternative User Interface Controls component version (Forms in Windows terminology). Additionally, the business logic controls may be implemented as a Java Beans component version or as a secure web services component version. The Java Beans version may be selected for direct invocation when an application is running on an intranet. Alternatively, secure web services may be invoked using Internet protocol (IP) over a less private network. The alternative components are each registered in the component list module 110 of the application server 100. The alternative components are stored in the component module 120. Accordingly, the application server 100 of the application delivery system can select and deliver alternative versions of application layers according to the profile information of the client device 180.

Figure 2:
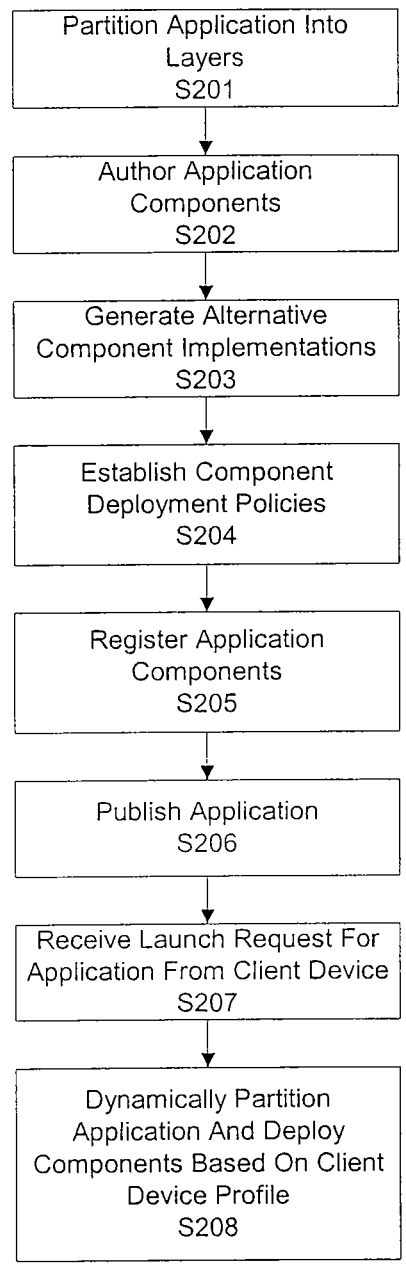
FIG. 2 is a flow diagram showing a method of creating, partitioning and delivering an application, according to an aspect of the present invention.

FIG. 2 is an exemplary diagram showing a method of creating, partitioning and delivering an application according to the present invention. At S201 the application is partitioned into layers by an application author. At S202, the author creates application components using the application framework. Alternative component implementations are generated at S203. Component delivery policies are established at S204.

The dynamic partitioning determination is made according to the component delivery policies established at S204. Additionally, after a determination is made whether a component can be supported on the client device 180, an appropriate version of the component may be selected from the alternatives generated at S203. The selection determination is used to determine which of a set of alternative versions of a component can, and should, be delivered to the client device 180 for execution. For example, a particular component may require the client device 180 to support a particular application parameter, e.g., available memory or processing speed. If the client device 180 does not support the parameter required by a version of the application component, an alternative version of the application component may be supported. If none of a set of alternative application component versions are supported by a client device 180, the application may still be executed when the application component can be retained at an application server 100 during execution.

Application components are registered at, e.g., the application server 100, at S205. Regardless of whether alternative application component versions are provided, the application components are registered. When only a single version of a component is registered at the application server, a determination is made whether the component can be partitioned from the application and delivered to the requesting client device 180. Additionally, when alternative versions of a component are provided, the versions of the components registered in the component list are associated with selection criteria. The selection criteria for a component are associated with the profile constraints of client devices 180. The partitioning determination may include a selection of a component version according to the parameters of the client device 180 and the selection criteria of the registered components. The selection determination is used to determine which of a set of alternative versions of a component can be delivered to the client device 180 for execution. For example, a particular component may require the client device 180 to support a particular application parameter, e.g., memory requirement or processing speed. If the client device 180 does not support the parameter required by a version of the application component, an alternative version of the application component may be supported. If none of a set of alternative application component versions are supported by a client device 180, the application may still be executed when the application component can be retained at the application server 100 during execution.

The application is then published at S206. At S207, a launch request for the application is received from the client device 180 at the application server 100. At S208, the application is dynamically partitioned based on a profile of the client device 180. Application components are delivered based on the partitioning and selection at S208. The delivered components of the application are delivered to the client device 180 while the retained components of the application (if any) are retained at the application server 100.

Figure 3:
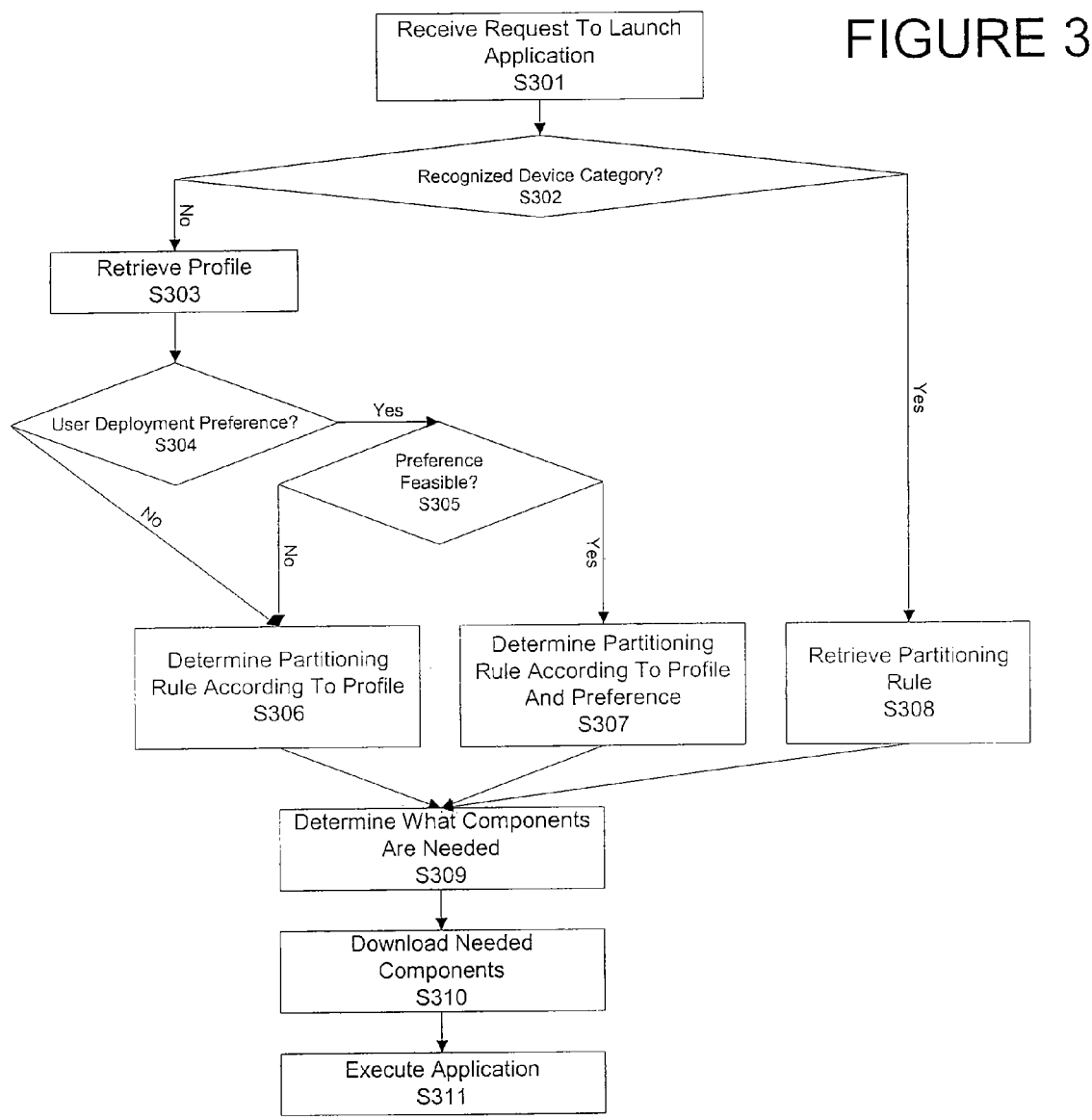
FIG. 3 is a flow diagram showing a method of delivering components of an application, according to an aspect of the present invention.

FIG. 3 is a diagram showing an exemplary method of delivering an application according to an aspect of the present invention. At S301, a request is received from, e.g., the client device 180, by, e.g., the application server 100, to launch an application. At S302, a determination is made whether the category of the requesting client device is recognized.

If the category of the requesting client device is recognized (S302=Yes), a partitioning rule based on the profile of the recognized client device 180 is retrieved at S308. The partitioning rule varies based on the profile of the recognized client device 180 and the particular requested application. If the client device 180 is not recognized (S302=No), a profile of the client device 180 is retrieved at S303. Additionally, a determination is made whether the user has a delivery preference at S304. If the user has a delivery preference (S304=Yes), a determination is made at S305 whether the preference is feasible. If the preference is not feasible (S305=No), or if the user does not have a delivery preference (S304=No), a determination is made at S306 whether components of the application can be supported by the client device 180. A selection from alternative components that can be supported by the client device 180 may also be made at S306. If the user's preference is feasible (S305=Yes), a determination whether components of the application can be supported is made in view of the user's preference at S307.

The components that can be supported by the client device 180 are subject to partitioning from the application. After determining the partitioning rule at S306 or S307, or after retrieving the partitioning rule at S308, a determination is made of which components are needed for delivery at S309. The determination at S309 is made because one or more application components may already reside on the requesting client device 180. Accordingly, an application component for the requested application may not be necessary if the component already exists on the client device 180. Any application components to be delivered that do not already exist on the client device 180 are downloaded at S310. The application is executed at S311.

Of course, the determination or selection of a particular component may be dependent upon the determination of other components of an application. For example, where one component is only capable of interacting with a particular version of another component, the particular version of the latter must be selected if the former is selected. Additionally, the selection of a particular component for delivery may have an effect on the profile of the requesting client device 180, e.g., the available memory. Accordingly, the partitioning determination may be performed for multiple components as a group. For example, all of the components of a layer may be selected at one time as a group based upon the profile of the client device 180. Accordingly, the partitioning determination at S306 or S307 may include, for example, sequentially determining individual components for delivery to a client device 180 in isolation, or the partitioning determination may include determining a group of compatible components for delivery to a client device 180 at one time.

Figure 4:
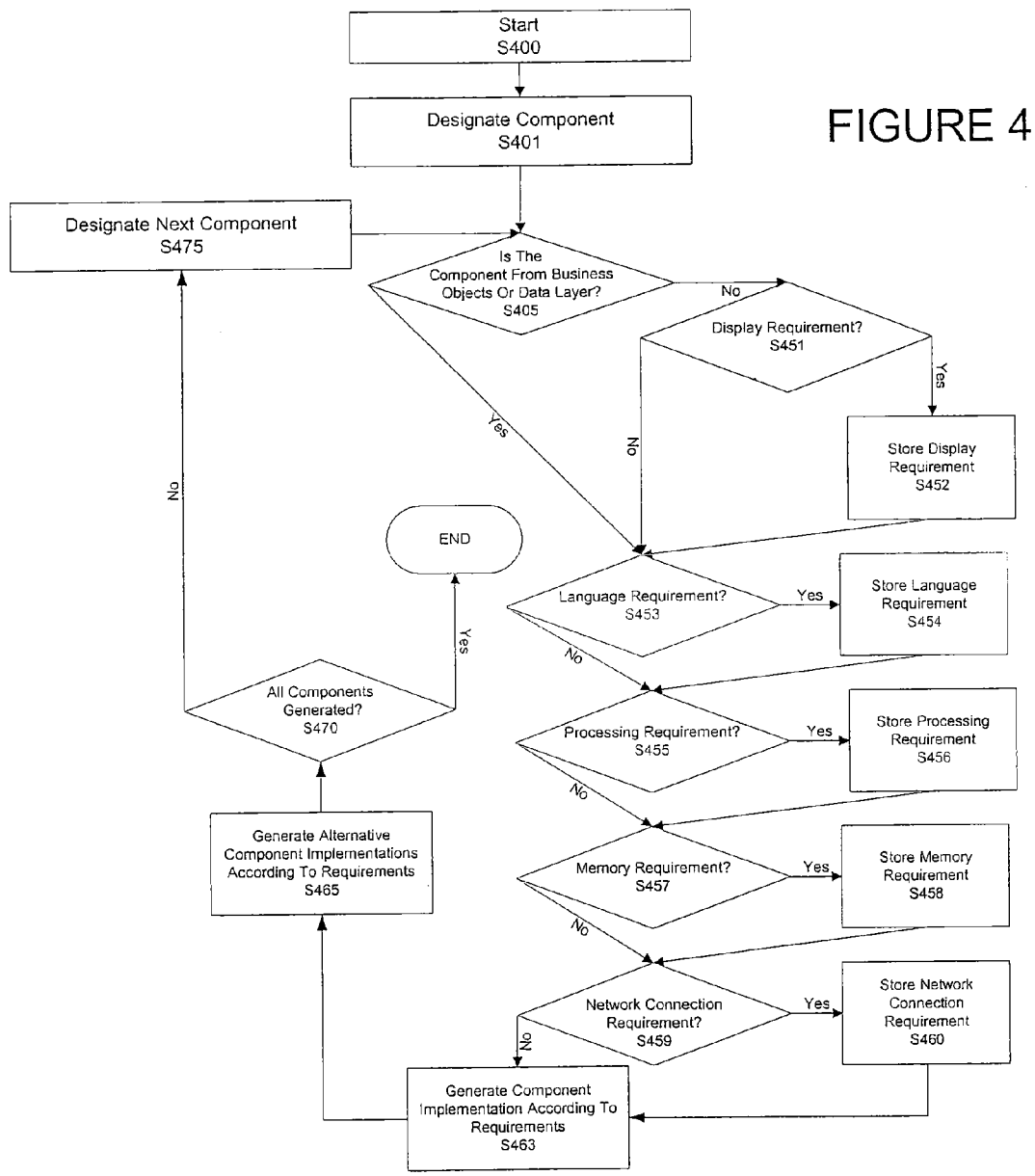
FIG. 4 is a flow diagram showing a method of generating application components, according to an aspect of the present invention.

FIG. 4 is a diagram showing an exemplary method of generating application components for an application according to an aspect of the present invention. The process starts at S400. At S401, a component is designated, and at S405 a determination is made whether the component is from the business objects or data layers. If the component is not from the business objects or data layers (S405=No), then at S451 a determination is made whether a display requirement exists for the component. If a display requirement exists for the component (S451=Yes), the display requirement is stored at S452. If a display requirement does not exist for the component (S451=No), or after the display requirement is stored at S452, or when the determination at S405 indicates the component is from the business objects or data layers (S405=Yes), a determination is made at S453 whether a language requirement exists for the component.

Because a display requirement should not affect the business objects layer components or the data layer components, a determination of a display requirement is not made at S451 for business objects layer and data layer components. As a result, the process of determining user device requirements and generating a component implementation and alternatives for a business objects layer component or a data layer component is performed from S453 to S465.

If a language requirement exists for the component at S453 (S453=Yes), the language requirement is stored at S454. If a language requirement does not exist for the component (S453=No), or after the language requirement is stored at S454, a determination is made at S455 whether a processing requirement exists for the component. If a processing requirement for the component exists at S455, the processing requirement is stored at S456. If a processing requirement for the component does not exist at S455 (S455=No), or after storing the processing requirement at S456, a determination is made at S457 whether a memory requirement exists for the component.

If a memory requirement exists at S457 (S457=Yes), the memory requirement is stored at S458. If a memory requirement does not exist at S457 (S457=No), or after the memory requirement is stored at S458, a determination is made at S459 whether a network connection requirement exists for the component. If a network connection requirement exists for the component at S459 (S459=Yes), the network connection requirement is stored for the component at S460.

If a network connection requirement does not exist for the component at S459 (S459=No), or after the network connection requirement is stored for the component at S460, the authoring framework is used at S463 to generate the component according to the requirements stored at S452, S454, S456, S458 and/or S460. The authoring framework is then used at S465 to generate alternative component implementations according to the stored requirements. In other words, once the relevant user device requirements are determined, the component is generated at S463 and alternative components are generated for the application at S465.

At S470, a determination is made whether all components have been generated. If additional components need to be generated (S470=No), the next component is designated at S475. After designating the next component at S475, a determination is made whether the next component is either a business objects layer or a data layer component at S405. If the next component is a business objects layer component or a data layer component at S405 (S405=Yes), the determination is made at S453 whether a language requirement exists for the component.

If the next component is not a business objects layer or data layer component (S405=No), a determination is made whether a display requirement exists for the component at S451. Accordingly, each time the process of generating a component is performed for a presentation layer component or an interaction layer component, the process of determining and storing requirements is repeated at steps S451 to S460. Additionally, each time the process of generating a component is performed for a business objects layer component or data layer component, the process of determining and storing requirements is repeated at steps S453 to S460. Once all components have been generated for the requested application (S470=Yes), the process ends.

Accordingly, any of a display requirement partitioning rule, a language requirement partitioning rule, a processing requirement partitioning rule, a memory requirement partitioning rule and a network connection partitioning rule may be created for a presentation layer or interaction layer component of the application. Additionally, any of a language requirement partitioning rule, a processing requirement partitioning rule, a memory requirement partitioning rule and a network connection partitioning rule may be created for a business objects or data layer component of the application. Of course, the noted rules are merely exemplary; any potential parameters or limitations of a client device may be the basis of additional rules for the business objects layer, the data layer or any other layer or components of an application.

The process shown in the example of FIG. 4 can be used to generate one or more components for an application. An author may generate components by layer, e.g., presentation layer components first, although generating components by layer is not required. Rather, FIG. 4 illustrates that an application component can be tailored to fit the requirements of user devices foreseen by the application author. Moreover, alternatives can be generated within the parameters specified by an application author.

Of course, the order of the steps shown in the example of FIG. 4 can be rearranged. For example, the process shown in the embodiment of FIG. 4 may be supplemented with additional steps. Alternatively, steps shown in the example of FIG. 4 may be modified or eliminated. For example, requirements may be determined for a different set of parameters of a client device 180 than are shown in S451, S453, S455, S457 and S459.

Accordingly, the application author is enabled to set client device 180 profile requirements for each component of an application. The profile requirements are used in partitioning the application when a request is received by, e.g., an application server to deliver the application. The application server delivers layers and/or components to the client device 180 according to the profile parameters of the client device 180. As a result, a client device 180 is provided with the most appropriate version, or the most appropriate layers and components, of the application according to the partitioning rules provided by the application author and executed at runtime.

Thus, an application is partitioned and components of the application are delivered to a client device 180 according to a profile of the client device 180 requesting the application. The client device 180 receives components of the application according to the ability of the client device 180 to support the components. Accordingly, a user of a client device is enabled to use a requested application according to the ability of the client device to support the application. As is explained, the ability to dynamically partition an application and deliver the partitioned application enables a user to experience aspects of the application that would not be provided if the application author is forced to provide the application in a predetermined unpartitioned form. According to the invention described above with respect to FIGS. 1-4, the application author enables the client device user to enjoy the most efficient and secure execution of the application by dynamically partitioning and delivering the application at runtime.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For example, additional client device requirements may be considered when generating components as in the embodiment of FIG. 4, and when partitioning an application for delivery to a client device as in the embodiment of FIG. 3.

Additionally, an application author may designate a priority order for the selection of components for partitioning and delivery. Accordingly, a final partitioning and delivery determination may be made after an eligibility determination is made for each application component according to the parameters of the client device. As a result, the application components can be partitioned and delivered in a preset order where, for example, the client device has limited memory or processing ability. Of course, the preset preference order for the selection of components will be subject to a determination whether the client device will support a preferred version of a component.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described. Furthermore, alternative software implementations including, but not limited to, distributed processing or component/object distributed processing, parallel processing, or virtual machine processing can also be constructed to implement the methods described.

It should also be noted that the software implementations of the present invention as described are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards, protocols and languages for object oriented programming (e.g., Java, Visual Basic, C++), integrated development environments, and program components (e.g., XHTML, WML), represent examples of the state of the art. Such standards are periodically superseded by faster or more efficient equivalents having essentially the same functions. Accordingly, replacement standards and protocols having the same functions are considered equivalents.

What is claimed is:

1. A method for delivering a software application to a client device, comprising:
   storing a plurality of alternate component versions for a first software component of a software application;
   storing a plurality of alternate component versions for a second software component of the software application;
   selecting one of the plurality of alternate component versions for the first software component upon receipt of a launch request for the software application from a client device;
   selecting one of the plurality of alternate component versions for the second software component upon receipt of the launch request for the software application from the client device;
   delivering the selected alternate component version for the first software component to the client device,
   wherein the selected alternate component version for the first software component is executed by the client device and the selected alternate component version for the second software component is executed by an application server.

2. The method according to claim 1, further comprising:
   determining a profile of the client device,
   wherein the selected alternate component version for the first software component and the selected alternate component version for the second software component are selected based on the determined profile.

3. The method according to claim 2,
   wherein the selected alternate component version for the first software component and the selected alternate component version for the second software component are dynamically partitioned into a first group and a second group based on the determined profile.

4. The method according to claim 3, further comprising:
   delivering the first group to the client device from the application server; and
   retaining the second group at the application server.

5. The method according to claim 1, further comprising:
   receiving, at the application server, the launch request from the client device to launch the software application.

6. The method according to claim 1,
   wherein the selected alternate component version for the first software component comprises a presentation layer software component.

7. The method according to claim 1,
   wherein the selected alternate component version for the first software component comprises an interaction layer software component.

8. The method according to claim 1, further comprising:
   determining a profile of the client device by determining a processing potential of the client device.

9. The method according to claim 1, further comprising:
   determining a user selection of a delivery preference and partitioning the selected alternate component version for the first software component and the selected alternate component version for the second software component into a first group and a second group according to the determined user selection.

10. The method according to claim 1, further comprising:
    forwarding an application manager to the client device to determine a profile of the client device.

11. The method according to claim 2, further comprising: requesting the client device to forward the profile.

12. A system for delivering a software application to a requesting client device, comprising:
- a storage that stores a plurality of alternate component versions for a first software component of a software application and that stores a plurality of alternate component versions for a second software component of the software application; and
- an application server that selects one of the plurality of alternate component versions for the first software component upon receipt of a launch request for the software application from a client device; that selects one of the plurality of alternate component versions for the second software component upon receipt of the launch request for the software application from the client device; and that delivers the selected alternate component version for the first software component to a client device,
- wherein the selected alternate component version for the first software component is executed by the client device and the selected alternate component version for the second software component is executed by an application server.

13. The system according to claim 12,
wherein the application server further determines a profile of the client device, and
wherein the selected alternate component version for the first software component and the selected alternate component version for the second software component are selected based on the determined profile.

14. The system according to claim 13,
wherein the selected alternate component version for the first software component and the selected alternate component version for the second software component are dynamically partitioned into a first group and a second group based on the determined profile.

15. The system according to claim 14,
wherein the first group is delivered to the client device from the application server;
wherein the second group is retained at the application server;
wherein the first group is executed by the client device, and
wherein the application is executed using the first group and second group.

16. The system according to claim 14,
wherein the first group comprises a presentation layer software component.

17. The system according to claim 14,
wherein the first group comprises a data layer software component.

18. The system according to claim 12,
wherein the application server determines a processor configuration of the client device.

19. The system according to claim 14,
wherein the application server determines a user selection of a delivery preference and partitions the selected alternate component version for the first software component and the selected alternate component version for the second software component according to the determined user selection.

20. The system according to claim 12,
wherein the application server forwards an application manager to the client device to determine a profile of the client device.

* * * * *